United States Patent
Lin et al.

(10) Patent No.: US 10,171,603 B2
(45) Date of Patent: Jan. 1, 2019

(54) USER SEGMENTATION TO PROVIDE MOTIVATION TO PERFORM A RESOURCE SAVING TIP

(71) Applicant: Opower, Inc., Arlington, VA (US)

(72) Inventors: Wayne Lin, Washington, DC (US); Deena Rosen, San Francisco, CA (US); David Royer, San Francisco, CA (US)

(73) Assignee: OPOWER, INC., Arlington, VA (US)

( * ) Notice: Subject to any disclaimer, the term of this patent is extended or adjusted under 35 U.S.C. 154(b) by 125 days.

(21) Appl. No.: 14/526,313

(22) Filed: Oct. 28, 2014

(65) Prior Publication Data

US 2015/0326679 A1    Nov. 12, 2015

Related U.S. Application Data

(60) Provisional application No. 61/992,165, filed on May 12, 2014.

(51) Int. Cl.
| | |
|---|---|
| *H04L 29/08* | (2006.01) |
| *H04W 4/021* | (2018.01) |
| *H04W 4/08* | (2009.01) |
| *G06Q 50/06* | (2012.01) |

(52) U.S. Cl.
CPC .............. *H04L 67/26* (2013.01); *H04L 67/12* (2013.01); *H04L 67/18* (2013.01); *H04L 67/22* (2013.01); *H04L 67/306* (2013.01); *H04W 4/021* (2013.01); *H04W 4/08* (2013.01); *G06Q 50/06* (2013.01)

(58) Field of Classification Search
CPC ....... H04L 67/26; H04L 67/306; H04L 67/12; H04L 67/18; H04L 67/22; H04W 4/08; H04W 4/021; G06Q 50/06
See application file for complete search history.

(56) References Cited

U.S. PATENT DOCUMENTS

| | | |
|---|---|---|
| 4,334,275 A | 6/1982 | Levine |
| 4,843,575 A | 6/1989 | Crane |
| 5,513,519 A | 5/1996 | Cauger et al. |

(Continued)

FOREIGN PATENT DOCUMENTS

| | | |
|---|---|---|
| AU | 2010315015 | 7/2014 |
| CA | 2779754 | 5/2011 |

(Continued)

OTHER PUBLICATIONS

International Search Report and Written Opinion for PCT Application No. PCT/US2015/038692, dated Sep. 24, 2015, 13 pages.

(Continued)

*Primary Examiner* — Michael A Keller
(74) *Attorney, Agent, or Firm* — Kraguljac Law Group, LLC (57) ABSTRACT

A computer-implemented method includes steps for identifying a plurality of similar users that are similar to a target user, and providing a notification to the target user, the notification comprising a suggested action for the target user. In certain aspects, a method of the subject technology can further include steps for providing comparison information to the target user, wherein the comparison information includes participation information regarding participation for the plurality of similar users, with respect to the suggested action.

20 Claims, 6 Drawing Sheets

(56) References Cited

U.S. PATENT DOCUMENTS

| | | | |
|---|---|---|---|
| 5,566,084 A | 10/1996 | Cmar | |
| 5,717,609 A | 2/1998 | Packa et al. | |
| 5,855,011 A | 12/1998 | Tatsuoka | |
| 5,873,251 A | 2/1999 | Iino | |
| 5,930,773 A | 7/1999 | Crooks et al. | |
| 5,948,303 A | 9/1999 | Larson | |
| 6,035,285 A | 3/2000 | Schlect et al. | |
| 6,088,688 A | 7/2000 | Crooks et al. | |
| 6,295,504 B1 | 9/2001 | Ye et al. | |
| 6,327,605 B2 | 12/2001 | Arakawa et al. | |
| 6,701,298 B1 | 3/2004 | Jutsen | |
| 6,732,055 B2 | 5/2004 | Bagepalli et al. | |
| 6,778,945 B2 | 8/2004 | Chassin et al. | |
| 6,785,620 B2 | 8/2004 | Kishlock et al. | |
| 6,972,660 B1 | 12/2005 | Montgomery, Jr. et al. | |
| 7,020,508 B2 | 3/2006 | Stivoric et al. | |
| 7,073,073 B1 | 7/2006 | Nonaka et al. | |
| 7,073,075 B2 | 7/2006 | Freyman et al. | |
| 7,136,710 B1 | 11/2006 | Hoffberg et al. | |
| 7,142,949 B2 | 11/2006 | Brewster et al. | |
| 7,149,727 B1 | 12/2006 | Nicholls et al. | |
| 7,200,468 B2 | 4/2007 | Ruhnke et al. | |
| 7,243,044 B2 | 7/2007 | McCalla | |
| 7,333,880 B2 | 2/2008 | Brewster et al. | |
| 7,356,548 B1 | 4/2008 | Culp et al. | |
| 7,444,251 B2 | 10/2008 | Nikovski et al. | |
| 7,460,502 B2 | 12/2008 | Arima et al. | |
| 7,460,899 B2 | 12/2008 | Almen | |
| 7,552,030 B2 | 6/2009 | Guralnik et al. | |
| 7,561,977 B2 | 7/2009 | Horst et al. | |
| 7,991,513 B2 | 8/2011 | Pitt | |
| 8,065,098 B2 | 11/2011 | Gautam | |
| 8,166,047 B1 | 4/2012 | Cohen et al. | |
| 8,180,591 B2 | 5/2012 | Yuen et al. | |
| 8,239,178 B2 | 8/2012 | Gray et al. | |
| D667,841 S | 9/2012 | Rai et al. | |
| 8,260,468 B2 | 9/2012 | Ippolito et al. | |
| 8,275,635 B2 | 9/2012 | Stivoric et al. | |
| 8,280,536 B1 | 10/2012 | Fadell et al. | |
| 8,348,840 B2 | 1/2013 | Heit et al. | |
| 8,375,118 B2 | 2/2013 | Hao et al. | |
| 8,417,061 B2 | 4/2013 | Kennedy et al. | |
| 8,429,630 B2 | 4/2013 | Nickolov et al. | |
| 8,478,447 B2 | 7/2013 | Fadell et al. | |
| 8,489,245 B2 | 7/2013 | Carrel et al. | |
| 8,583,288 B1 | 11/2013 | Rossi et al. | |
| 8,630,741 B1 | 1/2014 | Matsuoka et al. | |
| 8,660,813 B2 | 2/2014 | Curtis et al. | |
| 8,690,751 B2 | 4/2014 | Auphan | |
| D707,245 S | 6/2014 | Bruck et al. | |
| 8,751,432 B2 | 6/2014 | Berg-Sonne et al. | |
| D710,871 S | 8/2014 | McCormack et al. | |
| 8,805,000 B2 | 8/2014 | Derby et al. | |
| D714,335 S | 9/2014 | Cojuangco et al. | |
| D729,268 S | 5/2015 | Nies et al. | |
| 9,031,703 B2 | 5/2015 | Nakamura et al. | |
| D740,847 S | 10/2015 | Yampolskiy et al. | |
| 2001/0047290 A1 | 11/2001 | Petras et al. | |
| 2002/0065581 A1 | 5/2002 | Fasca | |
| 2002/0178047 A1 | 11/2002 | Or et al. | |
| 2002/0198629 A1 | 12/2002 | Ellis | |
| 2003/0011486 A1 | 1/2003 | Ying | |
| 2003/0018517 A1 | 1/2003 | Dull et al. | |
| 2003/0023467 A1 | 1/2003 | Moldovan | |
| 2003/0216971 A1 | 11/2003 | Sick et al. | |
| 2004/0024717 A1 | 2/2004 | Sneeringer | |
| 2004/0111410 A1 | 6/2004 | Burgoon et al. | |
| 2004/0140908 A1 | 7/2004 | Gladwin et al. | |
| 2005/0257540 A1 | 11/2005 | Choi et al. | |
| 2006/0089851 A1 | 4/2006 | Silby et al. | |
| 2006/0103549 A1 | 5/2006 | Hunt et al. | |
| 2006/0195438 A1 | 8/2006 | Galuten | |
| 2006/0246968 A1 | 11/2006 | Dyke-Wells | |
| 2007/0061735 A1 | 3/2007 | Hoffberg et al. | |
| 2007/0203860 A1 | 8/2007 | Golden et al. | |
| 2007/0213992 A1 | 9/2007 | Anderson et al. | |
| 2007/0255457 A1 | 11/2007 | Whitcomb et al. | |
| 2007/0260405 A1 | 11/2007 | McConnell et al. | |
| 2008/0027885 A1 | 1/2008 | van Putten et al. | |
| 2008/0147505 A1 | 6/2008 | Davis | |
| 2008/0167535 A1 | 7/2008 | Stivoric et al. | |
| 2008/0195561 A1 | 8/2008 | Herzig | |
| 2008/0244429 A1 | 10/2008 | Stading | |
| 2008/0281473 A1 | 11/2008 | Pitt | |
| 2008/0281763 A1 | 11/2008 | Yliniemi | |
| 2008/0304112 A1 | 12/2008 | Matsuno | |
| 2008/0306985 A1 | 12/2008 | Murray et al. | |
| 2009/0106202 A1 | 4/2009 | Mizrahi | |
| 2009/0106674 A1 | 4/2009 | Bray et al. | |
| 2009/0204267 A1 | 8/2009 | Sustaeta et al. | |
| 2009/0217175 A1 | 8/2009 | Bechtel et al. | |
| 2009/0217179 A1 | 8/2009 | Mons et al. | |
| 2009/0326726 A1 | 12/2009 | Ippolito et al. | |
| 2010/0025483 A1 | 2/2010 | Hoeynck et al. | |
| 2010/0076835 A1 | 3/2010 | Silverman | |
| 2010/0082174 A1 | 4/2010 | Weaver | |
| 2010/0099954 A1 | 4/2010 | Dickinson et al. | |
| 2010/0138363 A1 | 6/2010 | Batterberry et al. | |
| 2010/0156665 A1 | 6/2010 | Krzyzanowski et al. | |
| 2010/0179704 A1 | 7/2010 | Ozog | |
| 2010/0198713 A1 | 8/2010 | Forbes, Jr. et al. | |
| 2010/0217452 A1 | 8/2010 | McCord et al. | |
| 2010/0217549 A1 | 8/2010 | Galvin et al. | |
| 2010/0217550 A1 | 8/2010 | Crabtree et al. | |
| 2010/0217642 A1 | 8/2010 | Crubtree et al. | |
| 2010/0217651 A1 | 8/2010 | Crabtree et al. | |
| 2010/0232671 A1 | 9/2010 | Dam et al. | |
| 2010/0241648 A1 | 9/2010 | Ito et al. | |
| 2010/0286937 A1 | 11/2010 | Hedley et al. | |
| 2010/0289643 A1 | 11/2010 | Trundle et al. | |
| 2010/0324962 A1 | 12/2010 | Nesler et al. | |
| 2010/0332373 A1 | 12/2010 | Crabtree et al. | |
| 2011/0022429 A1 | 1/2011 | Yates et al. | |
| 2011/0023045 A1 | 1/2011 | Yates | |
| 2011/0029617 A1* | 2/2011 | Hsiao | G06Q 10/107 709/206 |
| 2011/0040666 A1 | 2/2011 | Crabtree et al. | |
| 2011/0061014 A1 | 3/2011 | Frader-Thompson et al. | |
| 2011/0063126 A1 | 3/2011 | Kennedy et al. | |
| 2011/0106213 A1* | 5/2011 | Davis | G06F 19/3406 607/59 |
| 2011/0106316 A1 | 5/2011 | Drew et al. | |
| 2011/0106328 A1 | 5/2011 | Zhou et al. | |
| 2011/0106471 A1 | 5/2011 | Curtis et al. | |
| 2011/0153102 A1 | 6/2011 | Tyagi et al. | |
| 2011/0178842 A1 | 7/2011 | Rane et al. | |
| 2011/0178937 A1 | 7/2011 | Bowman | |
| 2011/0202404 A1* | 8/2011 | van der Riet | G06Q 30/02 705/14.41 |
| 2011/0205245 A1 | 8/2011 | Kennedy et al. | |
| 2011/0231320 A1 | 9/2011 | Irving | |
| 2011/0251730 A1 | 10/2011 | Pitt | |
| 2011/0251807 A1 | 10/2011 | Rada et al. | |
| 2011/0282505 A1 | 11/2011 | Tomita et al. | |
| 2011/0282808 A1* | 11/2011 | Amram | G06Q 10/04 705/412 |
| 2011/0313964 A1 | 12/2011 | Sanchey Loureda et al. | |
| 2012/0036250 A1 | 2/2012 | Vaswani et al. | |
| 2012/0053740 A1 | 3/2012 | Venkatakrishnan et al. | |
| 2012/0066168 A1 | 3/2012 | Fadell et al. | |
| 2012/0078417 A1 | 3/2012 | Connell, II et al. | |
| 2012/0084063 A1 | 4/2012 | Drees et al. | |
| 2012/0179692 A1 | 7/2012 | Hsiao et al. | |
| 2012/0215369 A1 | 8/2012 | Desai et al. | |
| 2012/0216123 A1 | 8/2012 | Shklovskii et al. | |
| 2012/0259678 A1 | 10/2012 | Overturf et al. | |
| 2012/0290230 A1 | 11/2012 | Berges Gonzalez et al. | |
| 2012/0310708 A1* | 12/2012 | Curtis | G06Q 50/06 705/7.33 |
| 2012/0311052 A1* | 12/2012 | Lee | H04L 12/6418 709/206 |
| 2013/0060531 A1 | 3/2013 | Burke et al. | |
| 2013/0060720 A1 | 3/2013 | Burke | |
| 2013/0097481 A1 | 4/2013 | Kotler et al. | |

(56) References Cited

U.S. PATENT DOCUMENTS

| | | | |
|---|---|---|---|
| 2013/0173064 A1 | 7/2013 | Fadell et al. | |
| 2013/0218640 A1 | 8/2013 | Kidder | |
| 2013/0253709 A1 | 9/2013 | Renggli et al. | |
| 2013/0261799 A1 | 10/2013 | Kuhlmann et al. | |
| 2013/0262040 A1 | 10/2013 | Buckley | |
| 2014/0006314 A1 | 1/2014 | Yu et al. | |
| 2014/0012553 A1 | 1/2014 | Kelly | |
| 2014/0019319 A1 | 1/2014 | Derby et al. | |
| 2014/0074300 A1 | 3/2014 | Shilts et al. | |
| 2014/0107850 A1 | 4/2014 | Curtis | |
| 2014/0129160 A1 | 5/2014 | Tran | |
| 2014/0148706 A1 | 5/2014 | Van Treeck et al. | |
| 2014/0163746 A1 | 6/2014 | Drew et al. | |
| 2014/0207292 A1 | 7/2014 | Ramagem et al. | |
| 2014/0277795 A1* | 9/2014 | Matsuoka | G06Q 30/0202 700/291 |
| 2014/0337107 A1 | 11/2014 | Foster | |
| 2014/0351018 A1 | 11/2014 | Feldman | |
| 2015/0046301 A1 | 2/2015 | Wuerch | |
| 2015/0227522 A1 | 8/2015 | O'Donnell et al. | |
| 2015/0227846 A1 | 8/2015 | Mercer et al. | |
| 2015/0254246 A1 | 9/2015 | Sheth et al. | |
| 2015/0267935 A1 | 9/2015 | Devenish et al. | |
| 2015/0269664 A1 | 9/2015 | Davidson | |
| 2015/0310019 A1 | 10/2015 | Royer et al. | |
| 2015/0310463 A1 | 10/2015 | Turfboer et al. | |
| 2015/0310465 A1 | 10/2015 | Chan et al. | |
| 2015/0324819 A1 | 11/2015 | Lin et al. | |

FOREIGN PATENT DOCUMENTS

| | | |
|---|---|---|
| CA | 2832211 | 11/2012 |
| DE | 3703387 | 8/1987 |
| DE | 102011077522 | 12/2012 |
| EP | 0003010 | 7/1979 |
| EP | 2705440 | 3/2014 |
| EP | 2496991 | 9/2014 |
| GB | 1525656 | 9/1978 |
| GB | 2238405 | 5/1991 |
| JP | 2000-270379 | 9/2000 |
| JP | 2004-233118 | 8/2004 |
| JP | 2006-119931 | 5/2006 |
| JP | 2007-133468 | 5/2007 |
| JP | 2011-027305 | 2/2011 |
| JP | 2012-080679 | 4/2012 |
| JP | 2012-080681 | 4/2012 |
| JP | 2013-020307 | 1/2013 |
| WO | WO 03/102865 | 12/2003 |
| WO | WO 03/104941 | 12/2003 |
| WO | WO 2008/101248 | 8/2008 |
| WO | WO 2009/085610 | 7/2009 |
| WO | WO 2011/057072 | 5/2011 |
| WO | WO 2012/112358 | 8/2012 |
| WO | WO 2012/154566 | 11/2012 |
| WO | WO 2014/004148 | 1/2014 |
| WO | WO 2014/182656 | 11/2014 |

OTHER PUBLICATIONS

International Preliminary Report on Patentability for PCT Application No. PCT/US2010/055621, dated May 15, 2012, 8 pages.
International Search Report and Written Opinion for PCT Application No. PCT/US2010/055621, dated Dec. 23, 2010, 9 pages.
International Search Report and Written Opinion for PCT Application No. PCT/US2012/036539, dated Jul. 6, 2012, 8 pages.
International Preliminary Report on Patentability for PCT Application No. PCT/US2012/036539, dated Nov. 21, 2013, 7 pages.
International Search Report and Written Opinion for PCT Application No. PCT/US2013/046126, dated Aug. 22, 2013, 9 pages.
International Preliminary Report on Patentability for PCT Application No. PCT/US2013/046126, dated Jan. 8, 2015, 8 pages.
International Search Report for PCT Application No. PCT/US2014/036901, dated Aug. 28, 2014, 3 pages.
Patent Examination Report No. 1 for Australian Patent Application No. 2010315015, dated Dec. 17, 2013, 3 pages.
Extended European Search Report for European Patent Application No. 12782569.3, dated Nov. 27, 2014, 7 pages.
Author Unknown, "An Inconvenient Truth," Jan. 9, 2008, 2 pages, available at http://web.archive.org/web/2008019005509/http://www.climatecrisis.net/takeaction/carbonca/.
Author Unknown, "Calculate Your Impact," Jul. 28, 2008, 4 pages, available at http://web.archive.org/web/20080728161614/http://green.yahoo.com/calculator/.
Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/2008.
Author Unknown, "CoolClimate Calculator," May, 19, 2008, 15 pages, available at http://web.archive.orgi/web/20080519220643/bie.berkeley.edu/coolcale/calculations.html.
Author Unknown, "Lifecycle Climate Footprint Calculator," Berkeley Institute of the Environment, Nov. 23, 2007, 6 pages, available at http://web.archive.org/web/20071123115832/http://bie.berkeley.edu/calculator.
Author Unknown, "More than just a thermostat.," http://www.ecobee.com/, 4 pages, Jul. 16, 2013.
Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org.popups/misc/art20625.html.
Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.
Chen, Hanfeng, et al., "Testing for a Finite Mixture Model With Two Components," Journal of the Royal Statistical Society, Series B, vol. 66, No. 1, 26 pages, 2004.
De Prensa, Boletine, "TXU Energy Budget Alerts Give Consumers Control of Electricity Costs," TXU Energy, http://www.txu.com/es/about/press, 2 pages, May 23, 2012.
Deb, Partha, "Finite Mixture Models," Hunter College and the Graduate Center, CUNY NBER, FMM Slides, 42 pages, Jul. 2008.
D'Urso, M., et al., "A Simple Strategy for Life Signs Detection Via an X-Band Experimental Set-Up," Progress in Electromagnectics Research C, vol. 9, pp. 119-129 (2009).
Eckmann, J.P., et al., "Ergodic theory of chaos and strange attractors," Reviews of Modern Physics, vol. 57, No. 3, Part I, pp. 617-656, Jul. 1985.
Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.
Fels, Margaret F., "PRISM: An Introduction," Elsevier Sequoia, Energy and Buildings, vol. 9, pp. 5-18, 1986.
Fels, Margaret F., et al., Seasonality of Non-heating Consumption and Its effect on PRISM Results, Elsevier Sequoia, Energy and Buildings, vol. 9, pp. 139-148, 1986.
Figueiredo, Vera, et al., "An Electric Energy Consumer Characterization Framework Based on Data Mining Techniques," IEEE Transactions on Power Systems, vol. 20, No. 2, pp. 596-602, May 2005.
Fitbit® Official Site, "Flex, One & Zip Wireless Activity & Sleep Trackers," http://www.fitbit.com/, 4 pages, Jul. 15, 2013.
Friedman, Jerome, et al., "Regularization Paths for Generalized Linear Models via Coordinate Descent," Journal of Statistical Sotfware, vol. 33, Iss. 1, pp. 1-22, Jan. 2010.
Goldberg, Miriam L., et al., "Refraction of Prism Results into Components of Saved Energy," Elsevier Sequoia, Energy and Buildings, vol. 9, pp. 169-180, 1986.
Jansen, R.C., "Maximum Likelihood in a Generalized Linear Finite Mixture Model by Using the EM Algorithm," Biometrics, vol. 49, pp. 227-231, Mar. 1993.
Jawbone, "Know yourself. Live better." https://jawbone.com/up/, 7 pages, Jul. 15, 2013.

(56) References Cited

OTHER PUBLICATIONS

Leisch, Friedrich, "FlexMix: A General Framework for Finite Mixture Models and Latent Class Regression in R," Journal of Statistical Software, http://www.jstatsoft.org/, vol. 11 (8), pp. 1-18, Oct. 2004.
Liang, Jian, et al. "Load Signature Study-Part II: Disaggregation Framework, Simulation, and Applications," IEEE Transactions on Power Delivery, vol. 25, No. 2, pp. 561-569, Apr. 2010.
Liang, Jian, et al., "Load Signature Study-Part I: Basic Concept, Structure, and Methodology," IEEE Transactions on Power Delivery, vol. 25, No. 2, pp. 551-560, Apr. 2010.
Mint.com, "Budgets you'll actually stick to," Budgeting-Calculate and Categorize your spending, https://www.mint.com/how-it-works/budgeting/, 2 pages, Jul. 12, 2013.
Mint.com, "We're always on alert." Alerts for bills, fees & going over budget, https://www.mint.com/how-it-works/alerts/, 2 pages, Jul. 12, 2013.
Morabito, Kerri, "High User Campaign," posted at Kerri Morabito, posting date not given, © Kerri Morabito, 2015, available at <URL: http://www.kerrimorabito.com/high-user-campaign.html>.
Mori, Hiroyuki, "State-of-the-Art Overview on Data Mining in Power Systems," IEEE, pp. 33-37, 2006.
Muthen, Bengt, et al., Finite Mixture Modeling with Mixture Outcomes Using the EM Algorithm, Biometrics, vol. 55, pp. 463-469, Jun. 1999.
Nest, "The Learning Thermostat," http://www.nest.com/ 2 pages, Jul. 15, 2013.
Nike.com, "Nike + FuelBand. Tracks your all-day activity and helps you do more . . . ," http://www.nike.com/us/en_us/c/nikeplus-f.uelband. 7 pages, Jul. 15, 2013.
Rose, O. "Estimation of the Hurst Parameter of Long-Range Dependent Time Series," University of Wuirzburg, Institute of Computer Science, Research Report Series, Report No. 137, 15 pages, Feb. 1996.
Sawka, Michael N., et al., "Human Adaptations to Heat and Cold Stress," RTOMP-076, 16 pages, Oct. 2001.
Stephen, Bruce, et al. "Domestic Load Characterization Through Smart Meter Advance Stratification," IEEE Transactions on Smart Grid, Power Engineering Letter, vol. 3, No. 3, pp. 1571-1572, Sep. 2012.
Stoop, R., et al., "Calculation of Lyapunov exponents avoiding spurious elements," Physica D 50, pp. 89-94, May 1991.
Wang, Xiaozhe, et al. "Rule induction for forecasting method selection: meta-learning the characteristics of univariate time series," Faculty of information Technology, Department of Econometrics and Business Statistics, Monash University, pp. 1-34.
Wang, Xiaozhe, et al., "Characteristic-Based Clustering for Time Series Data," Data Mining and Knowledge Discovery, Springer Science & Business Media, LLC, vol. 13, pp. 335-364 (2006).
Wehrens, Ron, et al. "Self- and Super-organizing Maps in R: The kohonen Package," Journal of Statistical Software, vol. 21, Iss. 5, pp. 1-19, Oct. 2007.
Wikipedia, "Akaike information criterion," 6 pages, Aug. 17, 2012.
Wikipedia, "Mixture model," 10 pages, Oct. 7, 2012.
Final Office Action in co-pending U.S. Appl. No. 14/543,132, filed Nov. 17, 2014, dated May 23, 2018. (26 pgs).
Non-Final Office Action in co-pending U.S. Appl. No. 14/543,132, filed Nov. 17, 2014, dated Nov. 16, 2017 (19 pgs.).

* cited by examiner

USER SEGMENTATION TO PROVIDE MOTIVATION TO PERFORM A RESOURCE SAVING TIP

CROSS-REFERENCE TO RELATED APPLICATIONS

The present application claims the benefit of priority to U.S. Provisional Application Ser. No. 61/992,165, filed May 12, 2014, titled "ENERGY CAMPAIGN PLATFORM," which is hereby incorporated by reference in its entirety.

BACKGROUND

The subject technology relates to ways for motivating users to reduce resource consumption, and in particular for providing comparative energy use tips to encourage reductions in energy consumption.

There is a general need for reduction in resource consumption and, specifically, in energy consumption.

SUMMARY

In some implementations, user segmentation provides motivation to perform a resource saving tip. A computer-implemented method includes steps for identifying a plurality of similar users that are similar to a target user, and providing a notification to the target user, the notification comprising a suggested action for the target user. In certain aspects, a method of the subject technology can further include steps for providing comparison information to the target user, wherein the comparison information includes participation information regarding participation for the plurality of similar users, with respect to the suggested action.

Other implementations provide a system comprising at least one processor, a memory device including instructions that, when executed by the at least one processor, cause the at least one processor to identify a comparison set of users for a target user, calculate participation information for the comparison set of users with respect to a suggested action for the target user, and provide a notification to the target user, the notification comprising the suggested action for the target user and the calculated participation information for the comparison set of users.

Other implementations provide a non-transitory computer-readable storage medium including instructions that, when executed by a processor, cause the processor to identify a comparison set of users for a target user, and provide a notification to the target user, the notification comprising a suggested action for the target user, the notification further comprising a plurality of options that indicate the user's willingness to engage in the suggested action. In certain aspects, a non-transitory computer-readable storage medium of the subject technology can further provide comparison information to the target user, wherein the comparison information includes participation information regarding participation for the comparison set of users, with respect to the suggested action.

Details of one or more implementations are set forth in the accompanying drawings and the description below. Other features, aspects, and potential advantages will be apparent from the description and drawings, and from the claims.

BRIEF DESCRIPTION OF THE DRAWINGS

In the following description, reference is made to the following figures, and in which are shown by way of illustration specific embodiments in which the subject technology may be practiced. It is to be understood that other embodiments may be utilized and changes may be made without departing from the scope of the subject technology.

The "system" described herein may be implemented on a server or on a computing device. The term "tip" described herein refers to a suggestion, useful hint, idea, or practical fact that is given to a user. The term "comprising" means "including, but not necessarily limited to"; it specifically indicates open-ended inclusion or membership in a so-described combination, group, series and the like.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

The instant disclosure addresses the foregoing need by improving user comparisons and segmentation. According to various aspects of the subject technology, methods and systems for accurately grouping similar users together for use in providing targeted tip notifications are described.

By more accurately grouping users based on user similarities, improved user tip comparison data can be provided to users, increasing social incentives to follow resource use recommendations. For example, when provided with information on similarly situated users that have already followed a tip, or have committed to following a tip, aspects of the technology can improve social incentives for targeted tip advertising.

Certain systems have employed user comparisons with limited efficacy. In this respect, aspects of the technology allow for a means to motivate individuals to reduce resource (e.g., energy or electric power) consumption by grouping them together based on similarities and providing targeted notifications to them that contain information about other similarly situated users. When users are from a more similar background, there is an increased social incentive to follow energy use recommendations. For example, aspects of the technology can improve social incentives for targeted tip advertising with regards to similarly situated users that have already followed an energy saving usage tip, or have committed to following an energy saving usage tip.

In some aspects, energy use tips can include instructions or hints that provide information for how consumers can reduce energy usage, increase energy efficiency, and save money by reducing their energy use. The information provided to the user may include comparative information designed to motivate the user to conform to and follow the tips.

In some aspects, provided social comparison information can be accompanied with a selectable option, for example, that allows the user to indicate whether or not he/she is (or will) perform the tip. In some implementations, a user indication that they will perform the tip can increase the likelihood that the user will actually perform the tip, for example, due to the social pressures associated with the commitment.

FIGS. 1A-1F, illustrate example notifications 100 comprising messages 102a-102f (e.g., a tip or suggestion), statistic 104, and indicators 108, 110, 112.

Figure 1A:
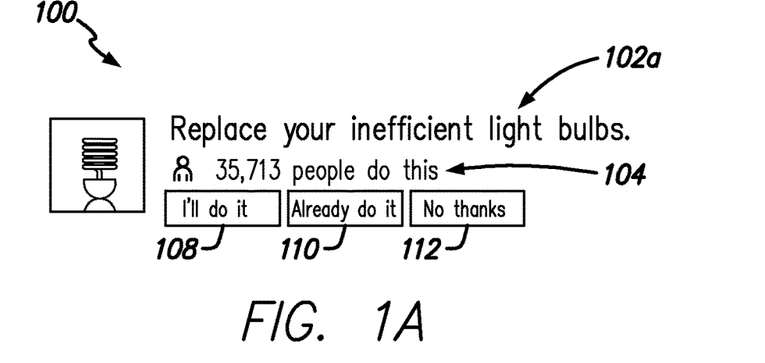
FIGS. 1A-1F illustrate examples of notifications to a user, according to certain aspects of the subject technology.
Figure 1B:
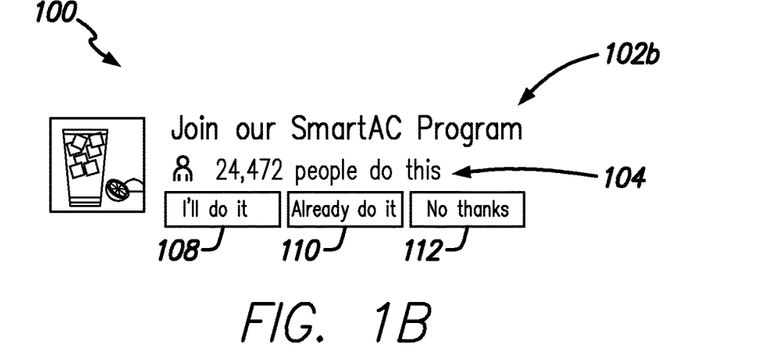
Figure 1C:
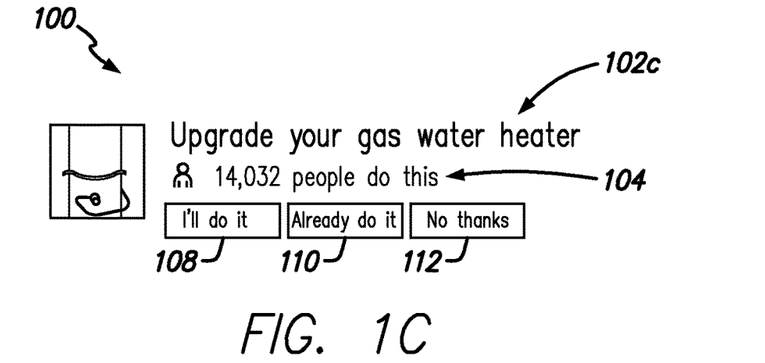
Figure 1D:
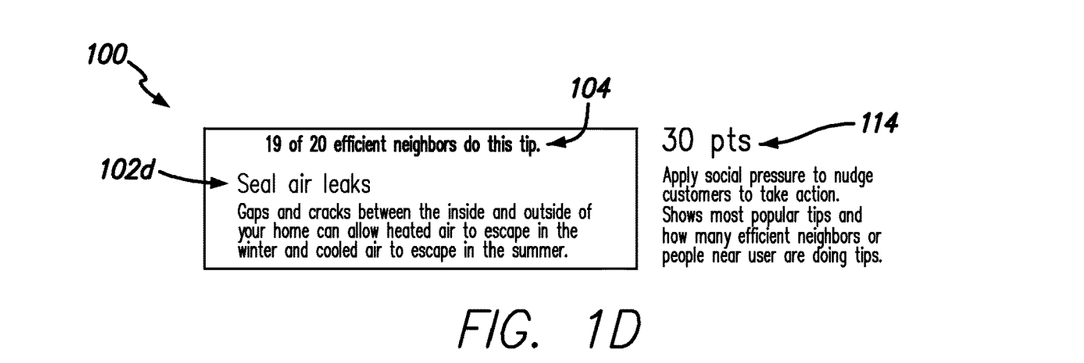
Figure 1E:
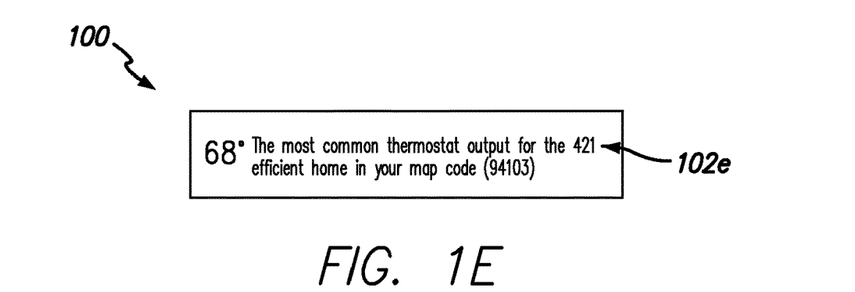

Although messages 102a-102f can include any information relating to user resource usage (e.g., a suggested action a system wishes a user to take), in some aspects, messages 102a-102f can include a tip or recommendation for reducing usage or consumption of a resource. In FIG. 1A, message 102a relates to ways for saving energy by replacing inefficient light bulbs; however, message 102a can be directed to saving other resources as well, including, but not limited to, gas, water, coal, etc. For example, message 102c in FIG. 1C is directed to saving gas by upgrading a gas water heater. In various embodiments, messages 102a-102e can be any energy saving usage tip, such as joining an energy saver program 102b (FIG. 1B), sealing air leaks 102d (FIG. 1D), or maintaining an energy saving thermostat output 102e (FIG. 1E).

In another example, a user can be given information regarding whether similar users are performing each tip through comparison information (e.g., a statistic) 104. Comparison information 104 can be a quantitative representation of how many similar users are performing the tip. In some implementations, a target user receiving a notification comprising comparison information 104 may be more greatly motivated to perform the associated action where comparison information 104 indicates that similarly situated users are also doing the same thing. Details regarding how similar users are selected are discussed below in relation to FIG. 2.

In some instances, comparison information 104 can be worded or framed by the system to maximize motivation on behalf of the target user. By way of example, comparison information 104 stating "90% of similar users in the user's neighborhood do this tip" would be highly motivating. However, if only 5% of similar users in the user's neighborhood do the tip, but 50% of all utility customers do the tip, it may be more motivating to provide comparison information 104 about the 50% of all utility customers who do the tip. Furthermore, comparison information 104 stating "56,239 users do this tip" may be more motivating than comparison information 104 that says "8% of all users do this tip" in the case where 8% of all users is, in fact, 56,239 users.

Several examples of comparison information 104 will now be presented, but it is understood that there are countless ways of wording comparison information 104 to convey the same meaning. In the following, "X", "Y", and "Z" represent numerical variables:

X neighbors do this tip.
X out of Y similar users do this tip.
Z % of users in your area (neighborhood, city, county, state, country, etc.) do this tip.
Z % of all users do this tip.
Z % of similar users in the area have done or have committed to doing this tip, would you like to commit to this tip too?

In some implementations, notification 100 is displayed on a user interface in combination with other similar notifications in the form of a list. The list can comprise multiple columns, or a single column. The order that notification 100 is displayed on the list can be determined by the system based on a rank, whereby the rank is based on the number (or ratio) of users that have done (or have committed to performing) the tip.

By way of example, a tip being performed by 100 people is ranked higher (and displayed farther up the list) than a tip that is being performed by 80 people. Alternatively, a tip being performed by 4 out of 5 people (80%) is ranked higher than a tip being performed by 1 out of 3 people (33%). In other implementations, tips may be ranked based on a combination of the percentage rank among tips and the number of people performing the each tip. The tips may be ranked when being displayed to the user and/or the system may select a certain number of the top ranked tips to display to the user. Additionally, in some aspects, tips are displayed in a user interface after a user selects a tip to do (or commit to). Alternatively, a tip may be removed from the list of recommended tips and a new tip (e.g., the next highest ranking tip) maybe shown to the user, in response to a user indication that he/she will not do the tip.

Once given the social comparison information in messages 102a-102f and comparison information 104, the user can use indicators 108, 110, and 112 to indicate whether or not the user will perform the tip. In one version of the invention, the user has the option to select whether the user: 1) will perform the tip 108, 2) not perform the tip 112, or 3) is already performing the tip 110. Indicators 108, 110, and 112 can be worded in various different ways to convey different types of user acceptance or refusal to perform an action, including, but not limited to, "I'll do it," "Already do it," and "No thanks." In some implementations, a user indication that they will perform the tip can increase the likelihood that the user will actually perform the tip, for example, due to the social pressures associated with the commitment. For example, the user's selection of indicators 108, 110, or 112 can be linked social networking applications such that people in the user's social network are notified of the user's decision whether or not to perform the tip. If a user's friends know that the user has committed to the tip, there is more incentive for the user to actually perform the tip.

Alternatively or additionally, the user indication that they will perform the tip may be recorded and used by the system for providing the user with subsequent communications. For example, the system may provide one or more reminders to a user that has committed to performing the tip (e.g., until the user indicates that they have performed the tip.) Furthermore, based on the user indication that they will do the tip, the user may be provided with instructions, information, or other resources regarding the tip.

In another aspect, a user is given points for completing a tip. Each notification 100 can include point value 114. The point value 114 can be determined by the system using various factors, including, but not limited to, the scarcity of an associated resource (e.g., electricity), difficulty in completing the tip, a cost of performing the tip, the popularity of the tip, etc. For example, point value 114 can be higher if it is popular among similar users to apply social pressure for the user to take action. Point value 114 can be added up with other point values, such that the summation of the point values can be a way for similar users to compare how they are doing with each other.

Alternatively or additionally, the user indication that they have completed the tip or is not planning to do the tip may be recorded and used by the system for providing the user with subsequent communications. For example, these tips may not be shown again to the user or will not be provided to the user for a period of time. Furthermore, the user's indication that they have completed the tip or is not planning to do the tip may be used to determine other tips to provide the user. For example, if a user indicates that he has already performed one tip, the system may provide the user with a similar tip (e.g., a tip with a similar difficulty level, similar goals or end results, etc.). In another example, if a user indicates that he has already performed one tip, the system may filter out related tips (e.g., if the user has recently indicated that they replaced an HVAC system for a new energy efficient model, the system can filter out tips for changing the air filter for the HVAC system for 3 months).

Figure 1F:
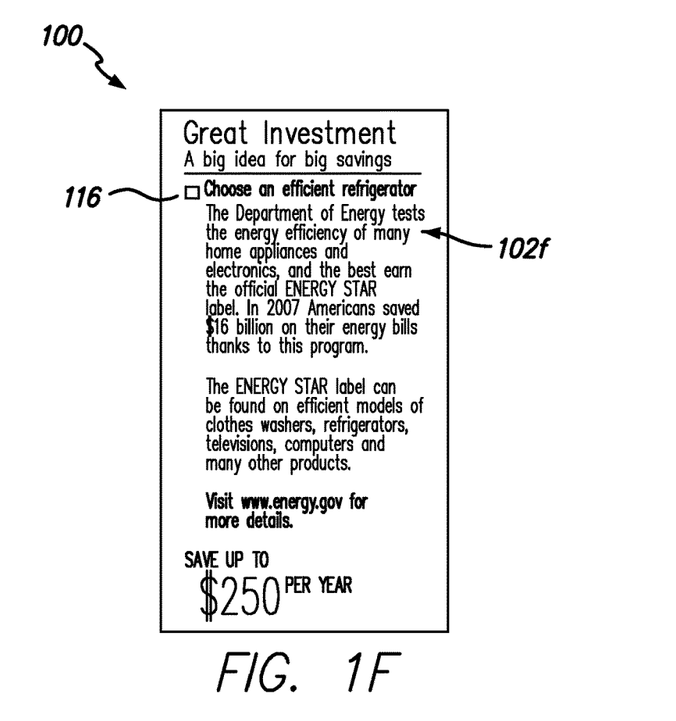

Alternatively, notification 100 can be in the form of message 102f with indicator checkbox 116, as in FIG. 1F. In this version of the invention, the user is presented with message 102f which describes the benefits of performing the tip. The user is given an option whether or not to perform the tip by checking checkbox 116 or leaving it unchecked. Checking checkbox 116 indicates if the user will perform the tip, while leaving checkbox 116 unchecked indicates the user will not perform the tip.

In practice, delivery of user notifications can occur via a portal or online user account. For example, a user can log into his/her account (e.g., for utilities, social networking, e-mail, etc.) from a user interface (e.g., a desktop computer, laptop computer, tablet computer, smartphone, mobile device, etc.). Once the user is logged in, the user can access a webpage that lists a plurality of notifications 100, each notification 100 presented substantially similar to the examples given in FIGS. 1A-1F. The user can browse through notifications 100 to make a decision regarding each tip by using indicators 108, 110, and 112. In some versions, notifications 100 can be rearranged, or additional notifications 100 can be presented or removed based on which indicator 108, 110, or 112 the user selects. For example, if a user indicates that he/she will perform a water saving tip, additional notifications 100 regarding saving water can be presented and/or moved up the list. Alternatively, notification 100 can be in the form of a physical document (e.g., a flyer, an insert in a utility bill, text in a utility bill, etc.) that is mailed to a user's address (e.g., home, work, etc.). In this version, a user can physically mark indicator 108, 110, and 112.

According to some aspects, user selection of indicators 108, 110, and 112 indicating whether or not the user will perform the tip may also be recorded and subsequently used by the system to calculate or determine information regarding whether users are performing each tip and/or comparison information (e.g., a statistic) 104.

Figure 2:
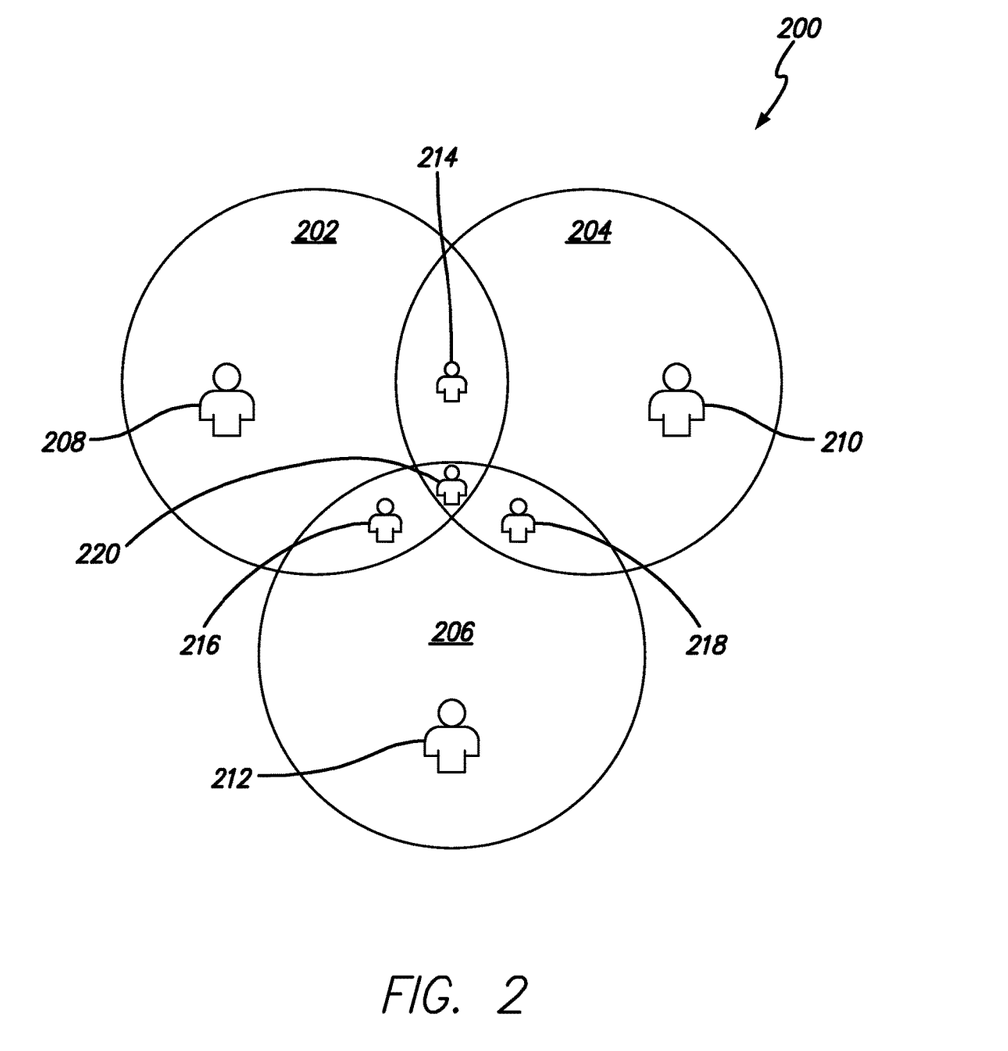
FIG. 2 illustrates a conceptual diagram for user segmentation based on various factors, according to certain aspects of the subject technology.

FIG. 2 illustrates diagram 200 of how similar users are selected based on various factors 202, 204, 206, according to certain aspects of the subject technology. Factors 202, 204, and 206 can be based on user specific information (e.g., demographic information) that can be used to group similar users. For example, factors 202, 204, 206, can be any combination of the following: shared geographic location (e.g., zip code, area code, state, etc.), social circle, economic circumstance, household size, enrollment in certain programs (e.g., smart meter programs, demand response programs, solar power programs, or energy efficiency programs), ownership of electric vehicles or solar installations, home type (e.g., single family home, apartment, condo, commercial, industrial, etc.), heating type, ownership type (e.g., a renting or owning household), hobbies, schools attended (e.g., elementary school, junior high, high school, college, graduate school, etc.), favorite sports teams, home square footage, similarities in resource consumption (e.g., from Advanced Metering Infrastructure (AMI) data), etc.

In one version, factor 202 can be a geographic location such as a zip code, factor 204 can be a hobby, and factor 206 can be a college attended. For example, users living in a certain zip code can be group 208, users with a certain hobby can be group 210, and users who attended a certain college can be group 212. Of these groups 208, 210, and 212, subgroups 214, 216, 218, and 220 are identified based on users with similar attributes. For example, subgroup 214 can comprise users who are in the same zip code and share the same hobby. Subgroup 216 can comprise users who are in the same zip code and attended the same college. Subgroup 218 can comprise users who have the same hobby and attended the same college. Finally, subgroup 220 can comprise users who live in the same zip code, have the same hobby, and attended the same college. In one version of the invention, similar users are selected out of subgroup 220 because users in subgroup 220 have the most in common.

In another version, the system may use more than 3 factors to determine a subgroup of similar users. The more similarities in the group of users, the more likely a user in the subgroup will perform a tip when presented with notifications about other users in the group. In some versions of the invention, the factors can be chosen according to likelihood of influencing a target user to perform the tip. For example, it may be the case that users who attended a certain college are more likely to perform a tip if many other users from the same college also perform the tip. In some cases, knowing that a group of users has low tip performance levels can influence a user to perform a tip as well. For example, if a user is told that fans of a rival sports team do not perform a certain energy saving tip, it may motivate the user to perform the tip in an effort to outdo the rival sports fans.

Figure 3:
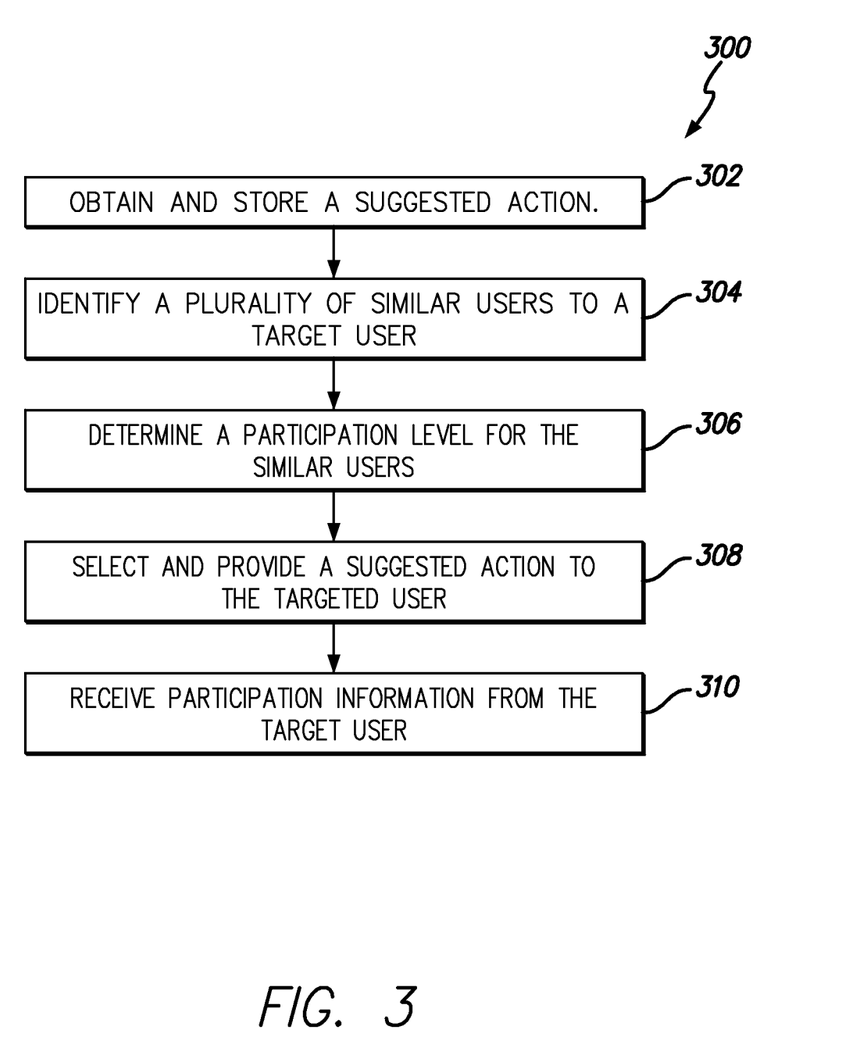
FIG. 3 illustrates an example of a flow diagram for providing a notification to a user, according to certain aspects of the subject technology.

FIG. 3 is flow diagram 300 of an example method for segmenting users to provide motivation to perform a resource saving tip. The method described below can be carried out using the configurations illustrated in FIG. 1, for example, and various elements of these figures are referenced in explaining the example method. Each block shown in FIG. 3 represents one or more processes, methods or subroutines, for example, that may be implemented entirely, or in part, by a system, such as that illustrated with respect to FIG. 4, discussed in further detail below. Furthermore, the illustrated order of blocks is illustrative only and the order of the blocks can change according to the present disclosure. Additional blocks can be added or fewer blocks may be utilized, without departing from this disclosure. The example method begins at block 302.

At block 302, one or more suggested actions (e.g., a tip) may be obtained and stored. In some implementations, the suggested action can be selected from, and stored on, a database (e.g., an application server). The database can be configured to store a plurality of suggested actions to include in multiple notifications. In some implementations, suggested actions are obtained from a variety of sources, including, but not limited to: customer data, survey information, energy use information, data regarding resource consumption, studies regarding resource management, etc. For example, survey information can indicate that a majority of users save energy by turning off their lights when they are not at home. As a result, a suggested action gathered from the survey information can be to suggest to a user to turn off his/her her lights when they are not at home. The suggested action can also be stored on an application server for future use.

At block 304, a plurality of users that are similar to a target user (i.e., "similar users") are identified. The target user can be identified or selected as anyone using a utility such as gas, water, electricity, etc., and can include any member of a group of users who has "opted in" to an energy savings program or indicated an interest in learning new ways to conserve energy resources. In another variation, the target user may be all residential customers of a particular utility. The plurality of similar users can be identified according to the description above in relation to FIG. 2. For example, factors associated with certain attributes of the target user are first identified, and then similar users that also have the same attributes as the target user are grouped together to form a subgroup comprising a plurality of similar users to the target user.

In some versions, similar users can share one or more factors in common, depending on how specific the factor is. If many users share the same factor, then the factor may not be specific enough, and additional factors may need to be considered. For example, geographic similarity may not be specific enough because many users can belong to a single geographic location (e.g., a state, a city, a region). Therefore, additional factors may need to be considered. In some versions, multiple factors are considered until a threshold minimum number of similar users is reached. For example, the threshold minimum number can be 100 or fewer similar users. The threshold minimum number can be determined by an administrator and can be any number. In some implementations the similar users can be all customers of a utility company.

At block 306, a participation level of the similar users is determined for each suggested action stored in the database. The participation level can be determined by receiving input from the similar users regarding whether the similar users are performing the suggested action. The input can be provided by the similar users in many ways known in the art, including, but not limited to, answers to a questionnaire, survey information, selecting an indicator (e.g., "I'll do it," "Already do it," or "No thanks"), etc. The input can be provided electronically (e.g., via a computer, smartphone, tablet computer, etc.) or through print mail (e.g., checking a box on a mailer and mailing to utility). In some implementations, the participation level is calculated by dividing the number of similar users performing the suggested action by the number of total users. In other implementations, the participation level is calculated by dividing the number of similar users performing the suggested action by the total number of similar users.

At block 308, a suggested action is selected and provided to the target user based on the participation level. In some implementations the suggested action is selected based on how many similar users are performing the suggested action. For example, if a suggested action has a participation level over 75%, then the suggested action can be selected to be provided to the target user. If a suggested action has a participation level under 50%, then the suggested action will not be provided to the target user, and another suggested action (e.g., a suggested action with over 50% participation) will be considered instead. In some implementations, a suggested action can be selected based on whether the target user has performed a similar action. For example, if the target user has performed a suggested action involving saving water (e.g., turning off sprinklers on the weekend), then another suggested action involving saving water (e.g., replacing leaky faucets) can be selected. In some implementations, a combination of factors can be considered in order to determine what suggested action to provide to the target user. For example, factors considered can include, but is not limited to, participation level of similar users, similarity of suggested action to suggested action previously performed, what type of action (e.g., actions involving replacing, repairing, reduction in use, change of habits, etc.), whether the target user previously declined a similar suggested action, a certain feature associated with the target user or the target user's home (e.g., a new appliance, a smart thermostat, a smart meter, an energy efficient air conditioner, the user is a renter or owner, the home is a condo or single family home, etc.), a particular moment that the target user is experiencing (e.g., the target user is a new mover, received bill that is higher than usual, etc.), or other factor. Furthermore, in one variation, suggested actions that the target user has indicated that they have already done will not be provided to the target user.

The suggested action can be provided in a notification using any type of communication channel, including, but not limited to, E-mail, paper mail, text messages (e.g., SMS), interactive voice response (IVR) services, flyers, mail advertisements, a user portal or account, etc.

At block 310, comparison information is selected and provided to the target user. In some implementations, the comparison information can be included in a notification along with a suggested action. In some implementations, the comparison information includes a numerical representation of how many similar users have agreed to perform a suggested action. For example, the numerical representation can be a percentage, a number, or any other quantitative representation (e.g., statistic) representing how many similar users have agreed to perform the suggested action. In some versions, the comparison information can be selected to be displayed in a way that optimizes a likelihood that the target user will decide to perform the action. For example, if only 9 out of 10 total similar users is performing a suggested action, then comparison information indicating that "90% of similar users" is performing the suggested action would be more effective. If 900 out of 9,000 similar users are performing the suggested action, then comparison information indicating that "900 similar users" are performing the suggested action would be more effective.

Similar to the suggested action, the comparison information can be provided in a notification using any type of communication channel, including, but not limited to, E-mail, paper mail, text messages (e.g., SMS), interactive voice response (IVR) services, flyers, mail advertisements, a user portal or account, etc.

At block 312, participation information is received from the user. The participation information relates to participation for the plurality similar users, with respect to the suggested action. In some versions, the target user may also contribute participation information by indicating whether they will perform the suggested action by selecting an indicator (e.g., "I'll do it," "Already do it," or "No thanks") that indicates whether the target user will perform the suggested action. The participation information can be provided electronically (e.g., via a computer, smartphone, tablet computer, etc.) or through print mail (e.g., checking a box on a mailer and mailing to utility) back to the system and used for subsequent calculations of participation information for the suggested action.

It is understood that user participation information can be saved at a central location or database, or disparately stored across multiple devices, for example in a network. As discussed in further detail with respect to FIG. 4, participation information can be stored on an application server for future reference/retrieval.

Figure 4:
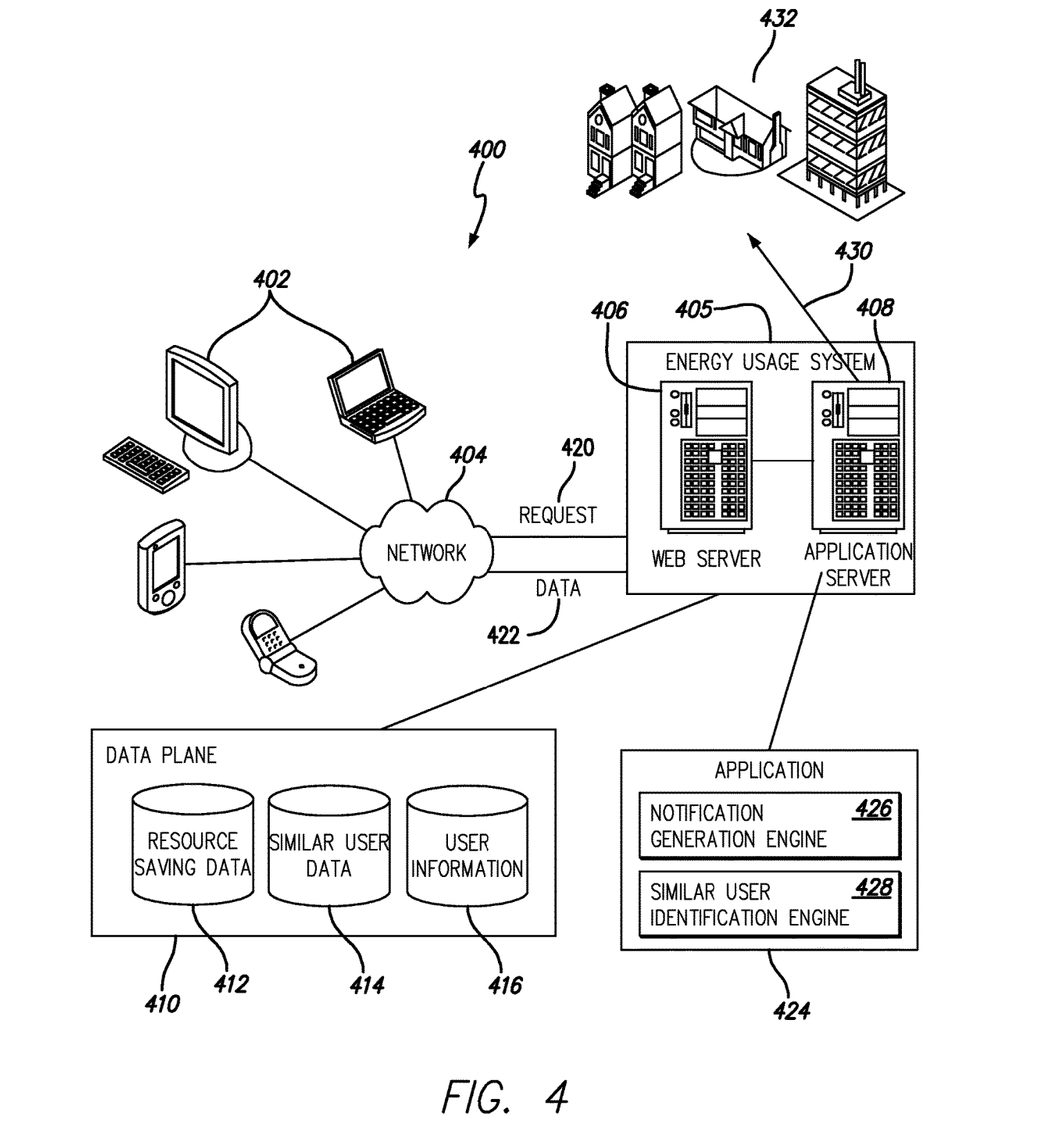
FIG. 4 illustrates an example networking system that can be used to implement certain aspects of the technology.

FIG. 4 illustrates an example of a system 400 for segmenting users to provide motivation to perform an energy saving tip, according to certain aspects of the subject technology. Although a web-based environment is described for purposes of explanation, different environments may be used, as appropriate, to implement various embodiments.

The example system 400 includes an energy usage management system 405 and a data plane 410. The energy usage management system 405 includes at least one web server 406 and at least one application server 408, as described below. The energy usage management system 405 is an example of a target user selection system implemented as computer programs on one or more computers in one or more locations, in which the systems, components, and techniques described below, can be implemented.

A user can interact with the energy usage management system 405 through a client device 402. For example, the client device 402 can be a computer coupled to the energy usage management system 405 through a data communication network 404 (e.g., the Internet). In some instances, the energy usage management system 405 can be implemented on the client device 402, for example, through a software application executing on the client device 402. The client device 402 generally includes a memory (e.g., a random access memory (RAM)), for storing instructions and data, and a processor for executing stored instructions. The client device 402 can be any appropriate device operable to send and receive requests, messages, or other types of information over the data communication network 404. The client device 402 can also include a display screen though which the user interacting with the client device 402 can view information, (e.g., a notification 100 of FIG. 1). Some examples of client devices include personal computers, smart thermostats, cellular phones, handheld messaging devices, laptop computers, set-top boxes, personal data assistants, electronic book readers, tablet devices, smartphones and the like.

The data communication network 404 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The client device 402 can communicate over the data communication network 404 using wired or wireless connections, and combinations thereof.

A user can use the client device 402 to submit a request 420 to log into the energy usage management system 405. The request 420 can request data representing information relating to resource saving tips for a corresponding utility account. The resource saving tips may correspond to consumed utilities associated with the corresponding utility customer. The resource saving tips may include information relating to similar users that are performing the tips. The resource saving tips also may include information relating to whether or not the user has agreed to perform the tips. When the user submits the request 420, the request 420 may be transmitted through the data communication network 404 to the application server 408 within the energy usage management system 405. The application server 408 responds to the request 420 by using, for example, resource saving data 412, to identify data 422 describing resource saving tips in response to the request 420. The application server 408 sends the data 422 through the data communication network 404 to the client device 402 for presentation to the user.

In some implementations, the resource saving tips can be generated internally at application server 408 and provided directly to utility customers (e.g., at a home, apartment, or office) 432 through delivery channels (e.g., paper mail, e-mail, SMS, IVR, etc.) 430. For example, a utility company can internally generate a set of resource saving tips for a group of users and provide the set of resource saving tips directly to the group of users at their homes. In some implementations, the group of users does not initiate the communication and can receive the communication unsolicited from the utility company.

The data 422 can include data describing a user interface for responding whether or not the user will perform the resource saving tip. The data 422 can be used, for example, by the client device 402, to select an indication of whether the user will perform, is already performing, or will not perform, the resource saving tip.

After receiving the data 422 from the application server 408, and through the data communication network 404, a software application, (e.g., web browser or application) 424, running on the client device 402 renders an interactive resource saving tip interface using the data 422. For example, a notification generation engine 426 in the application 424 can generate a notification comprising a message, a statistic, and an indication on a display screen of the client device 402.

In some aspects, the application 424 includes a similar user identification engine 428 that is configured to identify similar users that are already performing the resource saving tip. In some embodiments, the similar user identification engine 428 is configured to send data relating to similar users to similar user data storage 414.

In some embodiments, the web server 406, the application server 408, and similar components, can be considered to be part of the data plane 410. The handling of all requests and responses, as well as the delivery of content between the client device 402 and the application server 408, can be handled by the web server 406. The web server 406 and the application server 408 are merely example components. However, more or fewer components can be used as structured code can be executed on any appropriate device or host machine as discussed elsewhere herein.

The data plane 410 includes one or more resources, servers, hosts, instances, routers, switches, data stores, other similar components, or a combination thereof. The resources of the data plane 410 are not limited to storing and providing access to data. Indeed, there may be several servers, layers, or other elements, processes, or components, which may be chained or otherwise configured, and which can interact to perform tasks including, for example, obtaining data from an appropriate data store. In some embodiments, the term "data store" refers to any device or combination of devices capable of storing, accessing, and retrieving data, which may include any combination and number of data servers, databases, data storage devices, and data storage media, in any standard, distributed, or clustered environment.

The data stores of the data plane 410 can include several separate data tables, databases, or other data storage mechanisms and media for storing data relating to a particular aspect. For example, the data plane 410 illustrated includes mechanisms for storing resource saving data 412 and user information 416, which can be used to generate the notifications regarding resource saving tips. The data plane 410 is also shown to include a mechanism for storing similar user data 414, which can be used for purposes such as reporting a comparative analysis of the usage data for the corresponding utility customer to motivate the utility customer to conserve resources. The data plane 410 is operable, through logic associated therewith, to receive instructions from the application server 408 and to obtain, update, or otherwise process data, instructions, or other such information in response thereto, as described above.

Each server typically includes an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment including several computer systems and components that are interconnected through one or more communication links, using one or more computer networks or direct connections. However, the system described above can be configured to operate equally well using fewer or a greater number of components than are illustrated in FIG. 4. Thus, the system 400 in FIG. 4 is provided merely as one example, and does not limit the scope of the disclosure.

Figure 5:
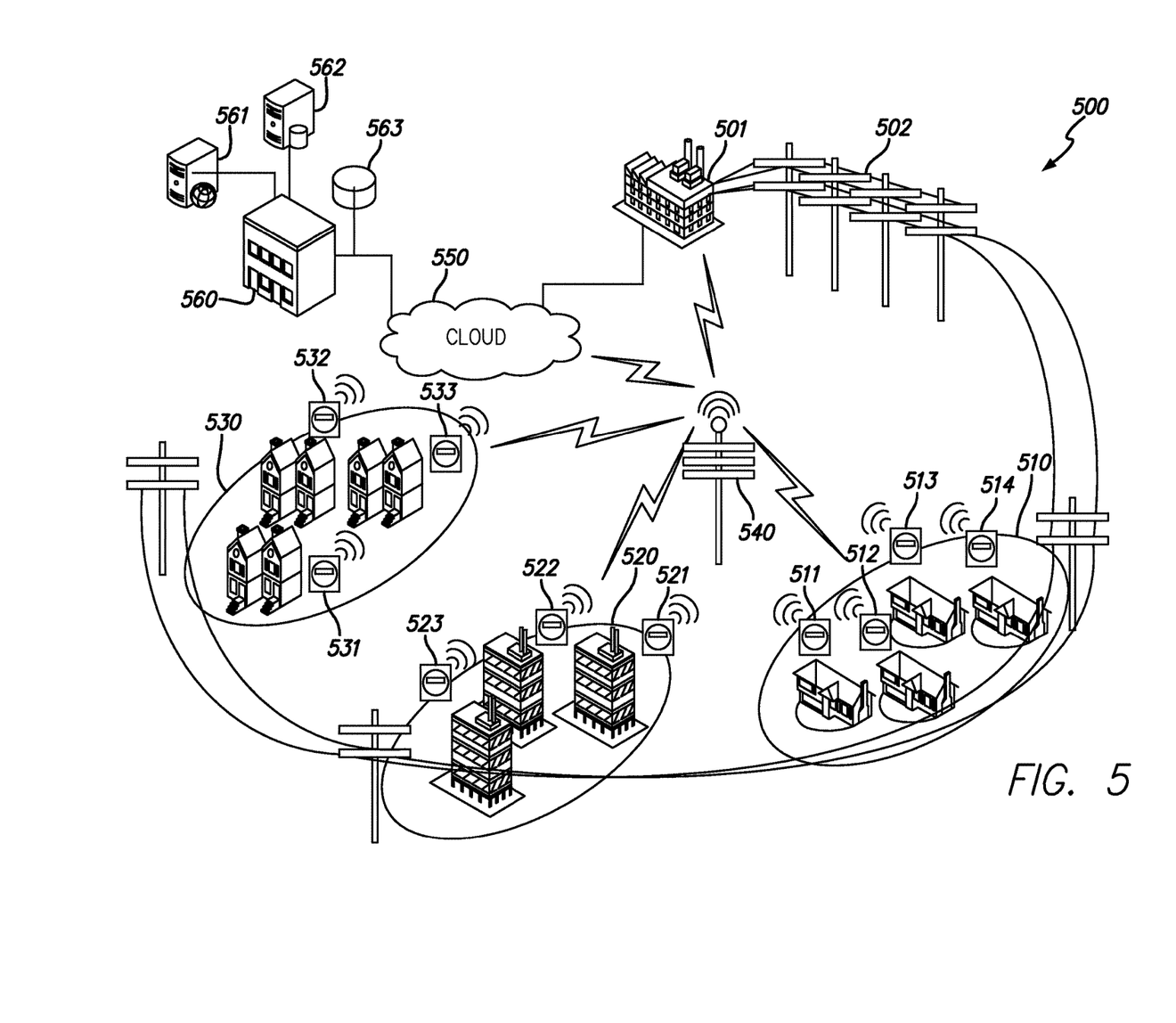
FIG. 5 illustrates an example of an environment for implementing aspects of the subject technology.

FIG. 5 illustrates an example of an environment 500 for implementing aspects in accordance with various embodiments. The environment 500 includes a utility company 501, utility distribution system 502, utility customer regions 510, 520 and 530, utility usage collector 540, a network 550 and a utility usage management system 560. The utility customer region 510 includes residential structures with corresponding smart meters 511-514. The utility customer region 520 includes commercial structures with corresponding smart meters 521-523. The utility customer region 530 includes multi-family structures with corresponding smart meters 531-533. The utility usage management system 560 includes a web server 561, an application server 562 and a database 563.

The utility company 501 provides a commodity (e.g., electricity, gas, water) to the utility customer regions 510, 520 and 530. The utility company 501 may track the utility usage from each region via a monitoring device (e.g., a smart meter) associated with each structure of the corresponding region. The utility company 501 may receive usage data that includes the amount of utility consumption (e.g., kWh) for the corresponding utility account. In an aspect, the utility company 501 receives the usage data from the utility usage collector 540 via a wireless communication system. In some aspects, the utility usage collector 540 may obtain the usage data by pulling the usage data from each of the smart meter devices. The smart meter devices may broadcast usage data on a periodic or scheduled basis. The utility company 501 also may receive the usage data from each monitoring device through a wired communication system.

The utility usage management system 560 is in communication with the utility company 501 via the network 550. The utility usage management system 560 may obtain the usage data from the utility company 501 via the network 550. In an aspect, the utility usage management system 560 receives the usage data via the network 550. The utility usage management system 560 may receive the usage data directly from the smart meter devices.

Each of the utility customer regions 510, 520 and 530 may correspond to a separate geographical location with a respective rate schedule. In some aspects, a utility usage notification for a corresponding utility customer in one region may be generated using usage data of similar users in the same region to provide the corresponding utility customer with a comparative analysis of its utility consumption (e.g., current energy usage compared to similar customers in the same zip code or within a certain radius).

The utility usage management system 560 communicates the utility usage notification to utility customers associated with the utility customer regions 510, 520 and 530. In some aspects, the utility usage management system 560 communicates the utility usage notification via the network 550. For example, the utility usage management system 560 may send the utility usage notification in an e-mail or the utility customer may log into the utility usage management system 560 (e.g., the web server 561 and/or application server 562) through an associated website to view the disaggregated usage data included in the utility usage alert notification. In other embodiments, the utility usage information including billing information is communicated back to the utility company 501 such that the utility company 501 can provide the utility usage notification to the utility customer.

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server (s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A computer-implemented performed by a computer and at least a processor, the method comprising:
    identifying, by at least the processor, a plurality of similar users that are similar to a target user;
    providing, by at least the processor by electronic communication, a notification related to energy consumption to the target user, the notification comprising a suggested action for the target user;
    determining, by at least the processor, participation information indicative of participation of the plurality of similar users in the suggested action;
    determining, by at least the processor, a level of effectiveness for each representation of a plurality of representations of the participation information, including a first level of effectiveness for a first representation of the participation information;
    selecting for presentation to the target user the first representation of the participation information, as an optimal representation, from the plurality of representations of the participation information based upon a determination, by at least the processor, that the first level of effectiveness is higher than levels of effectiveness for one or more other representations of the participation information; and providing, by at least the processor via an electronic communication channel, comparison information to the target user by electronic communication, wherein the comparison information includes the optimal representation of the participation information;

wherein the first representation is indicative of a percentage of the plurality of similar users determined to participate in the suggested action based upon the participation information; and wherein the method further comprises at least one of:
determining a second representation of the plurality of representations, wherein the second representation is indicative of a number of the plurality of similar users determined to participate in the suggested action based upon the participation information; or
determining a third representation of the plurality of representations, wherein the third representation is indicative of a proportion of the plurality of similar users determined to participate in the suggested action based upon the participation information.

2. The method of claim 1 further comprising:
generating a list of suggested actions;
receiving an indication, from the target user, of refusal to participate in a second suggested action of the list of suggested actions; and
in response to receiving the indication of refusal, removing the second suggested action from the list of suggested actions.

3. The method of claim 1 wherein the notification is generated with a plurality of selectable options that comprise (i) a first selectable option indicative of agreement to participate in the suggested action, and (ii) a second selectable option indicative of refusal to participate in the suggested action.

4. The method of claim 1 further comprising:
selecting, from a database, a plurality of suggested actions for conserving energy usage;
wherein the participation information is determined for each of the plurality of suggested actions from data from the similar users wherein the data indicates whether the similar users are performing each of the plurality of suggested actions;
generating, by at least the processor, a quantitative indication comprising a percentage or a total number of the plurality of similar users that are performing each of the suggested actions;
selecting, by at least the processor, one or more suggested actions from the plurality of suggested actions that have the quantitative indication greater than a threshold value; and
generating the notification by including the one or more suggested actions in the notification provided to the target user.

5. The method of claim 1 wherein the plurality of similar users are selected from users that comprise a similar geographic location as the target user.

6. The method of claim 1 wherein the plurality of similar users are selected from users that comprise a common social-networking group as the target user.

7. The method of claim 1 wherein the plurality of similar users are selected from users that comprise a similar economic circumstance as the target user.

8. A system comprising:
at least one processor; and
a memory device including instructions that, when executed by the at least one processor, cause the at least one processor to:
identify a comparison set of users for a target user;
calculate participation information for the comparison set of users with respect to a suggested action for the target user;
determine a level of effectiveness for each representation of a plurality of representations of the participation information, including a first level of effectiveness for a first representation of the participation information;
select for presentation to the target user the first representation of the participation information, as an optimal representation, from the plurality of representations of the participation information;
generate and provide, via an electronic communication channel, a notification related to energy consumption to the target user, the notification comprising (i) the suggested action for the target user, (ii) the first representation of the participation information for the comparison set of users, and (iii) a plurality of selectable options corresponding to participation in the suggested action by the target user; and
receive a selection of at least one of the selectable options from the target user;
wherein the first representation is indicative of a number of the comparison set of users determined to participate in the suggested action based upon the participation information; and
wherein the instructions further cause the at least one processor to at least one of:
determine a second representation of the plurality of representations, wherein the second representation is indicative of a percentage of the comparison set of users determined to participate in the suggested action based upon the participation information; or
determine a third representation of the plurality of representations, wherein the third representation is indicative of a proportion of the comparison set of users determined to participate in the suggested action based upon the participation information.

9. The system of claim 8, wherein the instructions further cause the at least one processor to:
determine information about participation in the suggested action by the target user based on the selection of the at least one of the selectable options.

10. The system of claim 8 wherein the plurality of selectable options comprises:
a first selectable option corresponding to a first decision regarding participation in the suggested action by the target user; and
a second selectable option corresponding to a second decision regarding participation in the suggested action by the target user.

11. The system of claim 8 wherein the notification is given a priority value in relation to other notifications according to at least one of the number, the percentage or the proportion of the comparison set of users that perform the suggested action.

12. The system of claim 8, wherein the instructions further cause the at least one processor to:
provide a second notification to the target user, the second notification comprising a second suggested action for the target user.

13. The system of claim 8 wherein the comparison set of users are selected from users that comprise a similar geographic location as the target user.

14. The system of claim 8 wherein the comparison set of users are selected from users that comprise a common social-networking group as the target user.

15. A non-transitory computer-readable storage medium including instructions that, when executed by a processor, cause the processor to:
   identify a comparison set of users for a target user;
   provide a notification related to energy consumption to the target user, the notification comprising a suggested action for the target user;
   determine participation information indicative of participation of the comparison set of users in the suggested action;
   determine a level of effectiveness for each representation of a plurality of representations of the participation information, including a first level of effectiveness for a first representation of the participation information;
   select for presentation to the target user the first representation of the participation information, as an optimal representation, from the plurality of representations of the participation information; and
   provide the first representation of the comparison information to the target user;
   wherein the first representation is indicative of a proportion of the comparison set of users determined to participate in the suggested action based upon the participation information; and
   wherein the instructions further cause the processor to at least one of:
      determine a second representation of the plurality of representations, wherein the second representation is indicative of a number of the comparison set of users determined to participate in the suggested action based upon the participation information; or
      determine a third representation of the plurality of representations, wherein the third representation is indicative of a percentage of the comparison set of users determined to participate in the suggested action based upon the participation information.

16. The non-transitory computer-readable storage medium of claim 15, the notification further comprising a plurality of selectable options comprising (i) a first selectable option indicative of agreement to participate in the suggested action, and (ii) a second selectable option indicative of refusal to participate in the suggested action, wherein the instructions further cause the processor to:
   determine information about participation in the suggested action by the target user based on a selection of the first selectable option or the second selectable option.

17. The non-transitory computer-readable storage medium of claim 15 wherein the notification is given a priority value in relation to other notifications according to at least one of the proportion, the number or the percentage of the comparison set of users that perform the suggested action.

18. The non-transitory computer-readable storage medium of claim 15 wherein the comparison set of users are selected from users that comprise one or more of a similar geographic location, common social-networking group, or economic circumstance as the target user.

19. The non-transitory computer-readable storage medium of claim 15 further comprising instructions that when executed by the processor cause the processor to:
   select, from a database, a plurality of suggested actions for conserving energy usage;
   wherein the participation information is determined for each of the plurality of suggested actions from data from the comparison set of similar users wherein the data indicates whether the similar users are performing each of the plurality of suggested actions;
   generate a quantitative indication comprising a percentage or a total number of the comparison set of similar users that are performing each of the suggested actions;
   select one or more suggested actions from the plurality of suggested actions that have the quantitative indication greater than a threshold value; and
   generate the notification by including the selected one or more suggested actions in the notification provided to the target user.

20. The non-transitory computer-readable storage medium of claim 15, wherein the instructions further cause the processor to:
   provide a second notification to the target user, the second notification comprising a second suggested action for the target user.

* * * * *